W. J. LITTLEFIELD.
COMPOSITION FOR CIGAR-LIGHTERS.
No. 177,134.
Patented May 9, 1876.
WITNESSES:
A. W. Almqvist
John Goethals
INVENTOR:
W. J. Littlefield
BY Munn
ATTORNEYS.

UNITED STATES PATENT OFFICE.

WILLIAM J. LITTLEFIELD, OF PHILADELPHIA, PENNSYLVANIA.

IMPROVEMENT IN COMPOSITIONS FOR CIGAR-LIGHTERS.

Specification forming part of Letters Patent No. 177,134, dated May 9, 1876; application filed April 4, 1876.

To all whom it may concern:

Be it known that I, WILLIAM JOHN LITTLEFIELD, of the city and county of Philadelphia, Pennsylvania, have invented a new and Improved Cigar-Lighter, of which the following is a specification:

The figure is a side view of one of my improved cigar-lighters, partly in section, to show the construction.

The object of this invention is to furnish improved cigar-lighters which will retain the heat much longer than other lighters, and will not drop from their stem when partly burned, and which shall be free from unpleasant odor when burning.

The invention will first be described, and then pointed out in the claim.

In preparing my improved lighters, I take one and three-fourth ounce of lime, eight ounces of charcoal, two ounces of cascarilla bark, four ounces of chlorate of potash, one ounce of Arabic gum, and ten ounces of water. These ingredients are then thoroughly mixed, more water being added, if necessary, to bring the mixtures to about the consistency of molasses. Small glass rods or tubes A are then taken and one or both their ends are dipped into the mixture. When the mixture upon the ends of the rods or tubes is sufficiently dried, the said ends are again dipped into the mixture, and so on, until heads B of proper size have been formed. When the heads B have become of proper size, their ends are dipped into a fulminate, C, formed according to any of the well-known recipes. With this construction, when friction is applied to the fulminate, the head B becomes a red-hot coal, and retains its heat, so that a number of cigars or pipes may be lighted with the same head. The glass stems C do not char as if made of wood, and consequently the heads do not drop off almost as soon as lighted, and, being non-conductors, they enable the lighters to be held by said stems without burning the fingers.

I am aware that all the ingredients, except lime, have been used, but without an admixture of lime the compound evolves gases with a noxious and unpleasant odor; hence

What I claim is—

A compound of lime, charcoal, cascarilla bark, gum, and water, in substantially the proportions specified, for the purpose set forth.

WILLIAM JOHN LITTLEFIELD.

Witnesses:
JOHN B. GEISZ,
WILLIAM HAINSWORTH.